United States Patent Office 3,422,532
Patented Jan. 21, 1969

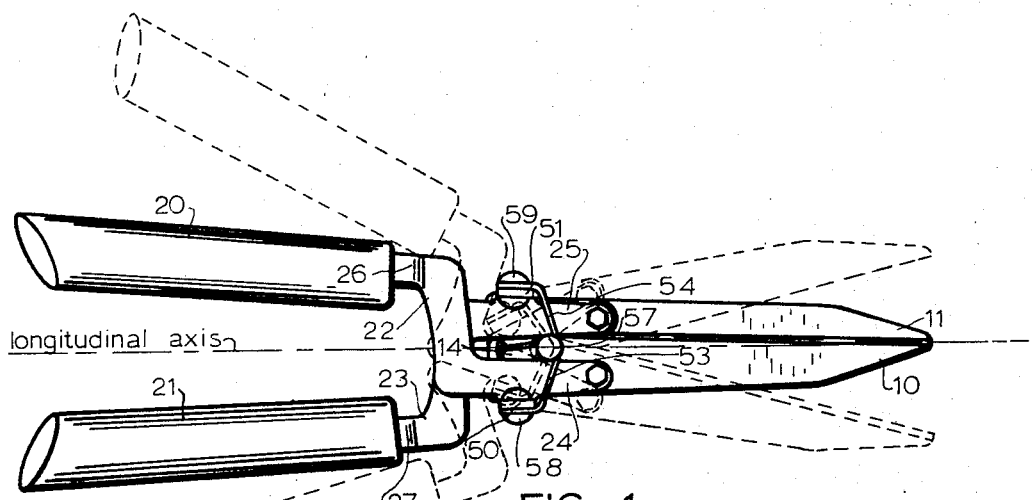

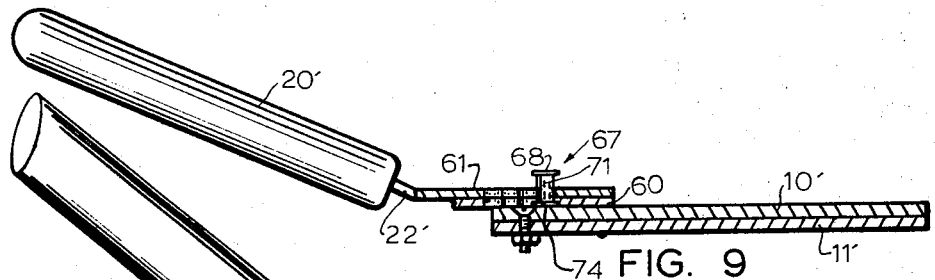
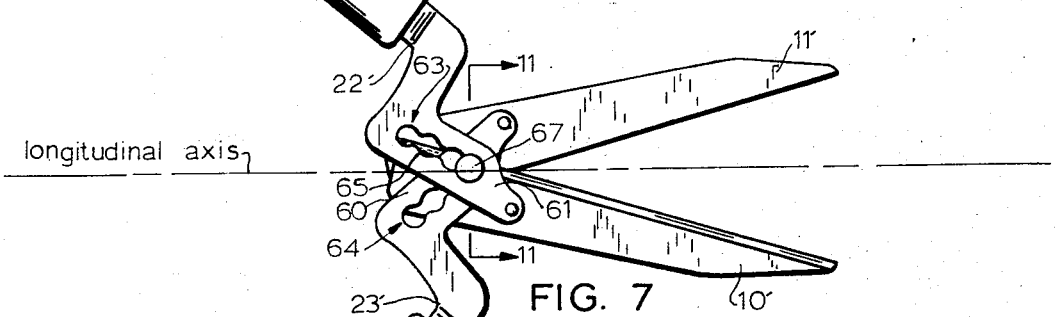
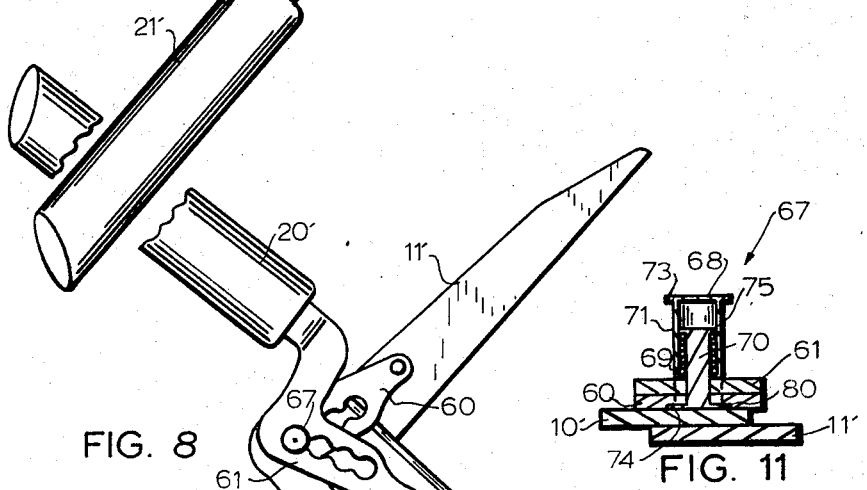
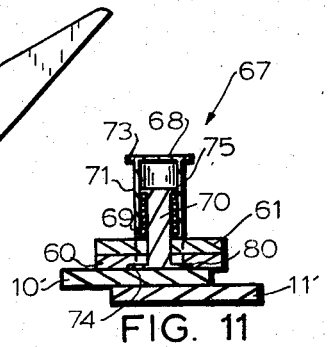
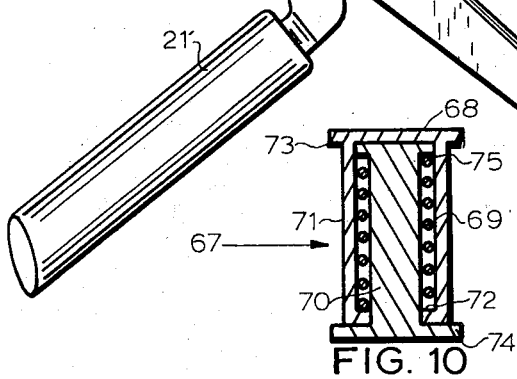

1

3,422,532
ADJUSTABLE COMPOUND SHEARS
Robert L. Ballard, Pittsburgh, Pa., assignor to H. K. Porter Company, Inc. (Delaware), Pittsburgh, Pa., a corporation of Delaware
Filed Feb. 1, 1967, Ser. No. 613,325
U.S. Cl. 30—252                     7 Claims
Int. Cl. B26b 13/04

ABSTRACT OF THE DISCLOSURE

Compound shears having a pair of cutting blades with a connecting pivot and a pair of handles having crossing handle extensions with a separate connecting pivot are constructed such that one of such pivots is an adjustable pivot which is adapted to selectively change the mechanical advantage between the pair of cooperating handles and the pair of cutting blades. By moving the adjustable pivot the mechanical advantage may be changed so as to have either a narrow blade opening with a high mechanical leverage for limbs and the like or a wide blade opening with a low mechanical leverage for thin hedges and the like.

BACKGROUND OF THE INVENTION

Field of the invention

This invention relates to compound lever hand cutting tools and, more particularly, to hedge shears having a pair of pivoted blades, a pair of handles having crossing blade extensions each of which is pivotally connected to a selected blade and an adjustable pivot connecting the handle extensions in a manner whereby the adjustable pivot may be moved relative the blade pivot so as to increase or decrease the mechanical advantage between the blades and handles as desired.

Description of the prior art

The most common hedge shears available today and known in the art are comprised of a pair of crossed blade handles which are held together by means of a single pivot. These shears have the primary disadvantage of requiring excessive amounts of effort to attain the desired cutting action. This disadvantage has been partially overcome by extending the length of the handles so as to increase the inherent leverage in the system; however, shears which are adapted to cut relatively thick material are not adapted to cut thin twigs or the like for the blades are short and the angle of opening between the blades is relatively narrow.

One type of compound lever hedge shears currently shown in the art includes a pair of blades which are held together by a pivot at one end and a pair of crossed blade handle levers which are positioned on the upper and lower surfaces of the composite blade structure and are pivoted by a pin means which extends through the blades, the pin means being located on the forward side of the blade pivot so as to increase the mechanical advantage which could normally be expected to be produced by means of the handles. A structure of this type is shown in U.S. Patent No. 3,187,430 to Wallace in which the lever means increases the mechanical advantage that would normally exist between the blades and the handles; however, the increase in mechanical advantage is not achieved without certain disadvantages for the included angle of opening of the blades is approximately only one-half the included angle of opening of the handles and the blade speed is only approximately one-half the handle speed which results in slow cutting. Thus, it can be seen that while shears of the Wallace type are especially adapted to cut heavier material, they are not particularly adapted to cut light material where a fast-opening blade greatly facilitates the rate at which that work may be completed.

SUMMARY OF THE INVENTION

The present invention overcomes the foregoing disadvantages by providing compound lever shears in which an adjustable pivot joins the handle extensions and is movable relative the blade pivot to increase or decrease the mechanical advantage existing between the blades and the handles. The shears are thus adapted for light, fast cutting, moderate cutting or heavy shearing, depending upon the needs of the user. By moving the adjustable pivot which pivotally connects the handle extensions into a position on the blade side of the blade pivot, the mechanical advantage is greatly increased so as to permit the cutting of heavy material. As the adjustable pivot is moved rearwardly towards the handle portions, the shearing power in the blade is reduced and the speed at which the blades may be opened and closed and the included angle of opening between the blades are increased. Therefore, an object of this invention is to provide compound shears with an adjustable pivot whereby the mechanical advantage existing between the cooperating blades and cooperating handles may be varied accordingly.

Another object of this invention is to provide compound shears with an adjustable pivot which is pivotally mounted on the handle extensions and which pivotally connects the handle extensions so that the adjustable pivot may be inverted from a position of providing high blade speed and low mechanical advantage to a position which provides high mechanical advantage and low blade speed.

A further object of this invention is to provide compound shears with a movable blade pivot which is adapted to be slid relative a fixed handle pivot whereby the mechanical advantage and speed of the blades may be accordingly determined.

Yet another object of this invention is to provide compound shears with a fixed blade pivot and a slidable handle pivot whereby the opening and closing speed of the blade and the mechanical advantage transferred from the handles to the blades may be increased or decreased accordingly by moving the slidable pivot relative to the fixed blade pivot.

Other objects and advantages of this invention will become apparent when the description and claims are read in conjunction with the drawings.

DESCRIPTION OF THE DRAWINGS

FIGURE 1 is a plan view of the first embodiment of the invention showing the adjustable pivot in a position being forward of the blade pivot to increase the mechanical advantage of the blades relative the handles and showing, in skeletons, the handles and blades in an open position;

FIGURE 2 is a plan view of the first embodiment of the invention showing the adjustable pivot in a rearward position relative the blade pivot so as to decrease the mechanical advantage existing between the blades and the handles and showing the opened position of the blades and handles in skeletons;

FIGURE 7 is a plan view of the second embodiment of the invention showing an adjustable pivot pin in a forward position relative the fixed blade pivot and showing the included angle of opening of the blades;

FIGURE 8 is a plan view of the second embodiment of the invention showing the pivot pin in a rearward position with respect to the fixed blade pivot and showing the included angle of opening of the blades;

FIGURE 9 is a section view taken along lines 9—9 of FIGURE 12 and showing the blades in a closed position;

FIGURE 10 is an enlarged section view of the pivot pin showing the elements thereof;

FIGURE 11 is an enlarged fragmentary section view taken along lines 11—11 of FIGURE 7 and showing the pivot pin in an extended position and adapted for sliding in the provided track relative the fixed blade pivot;

FIGURE 12 is a fragmentary plan view of the second embodiment of the invention in FIGURE 7 and shown in a closed position.

DESCRIPTION OF THE PREFERRED EMBODIMENTS OF THE INVENTION

Figure 3:
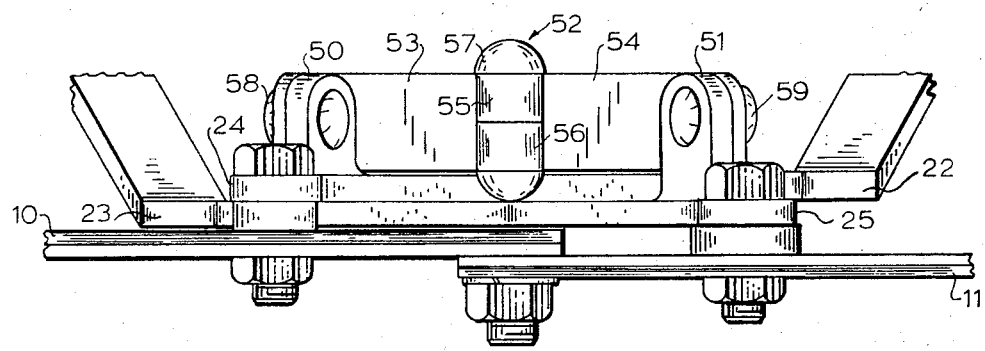
FIGURE 3 is an elevation righthand view of the first embodiment of the invention showing the adjustable pivot in a rearward position with respect to the blade pivot.
Figure 4:
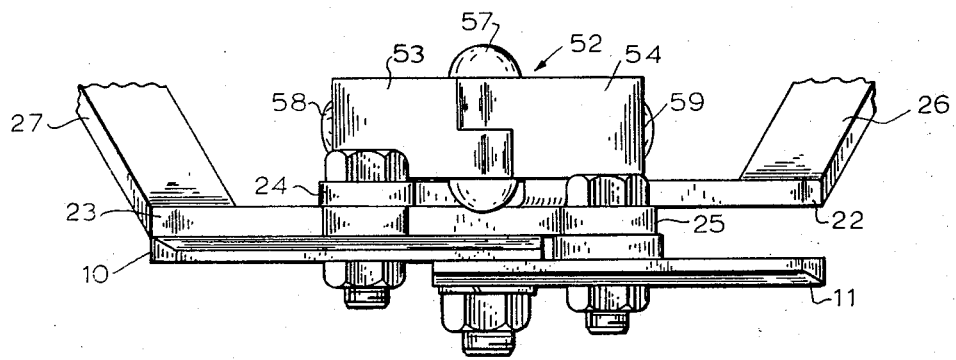
FIGURE 4 is a righthand elevation view of the first embodiment of the invention showing the adjustable pivot in a forward position relative the blade pivot.
Figure 5:
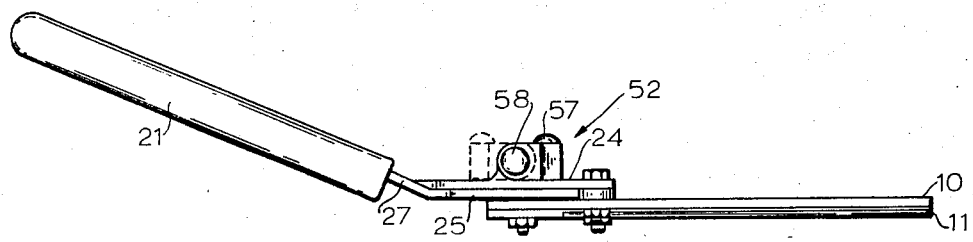
FIGURE 5 is a front elevation view of the first embodiment of the invention showing the adjustable pivot in a forward position relative the blade pivot and in skeletons, in a rearward position relative the blade pivot.
Figure 6:
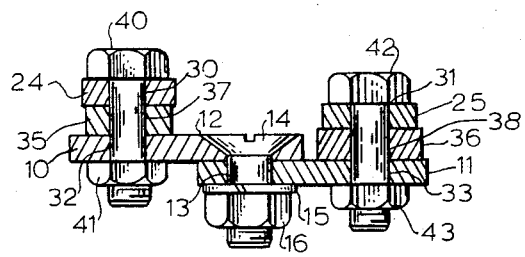
FIGURE 6 is a fragmentary section view taken along the blade pivot 14 and the handle to blade pivot connections 40, 42.

In reference to FIGURES 1 through 6, upper blade 10 and lower blade 11 comprise a pair of cutting blades, each of which is provided with a cutting edge in the usual manner. Upper cutting blade 10 is provided with a countersunk beveled opening 12 (FIGURE 6) and blade 11 is provided with opening 13 which is in axial alignment with opening 12. Blades 10 and 11 are pivotally interconnected adjacent their rearward extremities in flat head screw 14 which has its head portion residing in the bevel opening 12 and shaft portion residing in opening 13 of blades 10 and 11, respectively. Flat head screw 14 is provided with washer 15 and hexagon nut 16 which is threadably mounted thereon and which in combination with flat head screw 14 secures blades 10 and 11 together in a free moving pivotal relationship and forming a so-called floating blade pivot.

Handles 20 and 21 are provided with handle extensions 22 and 23, respectively, and are disposed in a single plane which is inclined relative to the horizontal planes in which the blades reside. Handle extensions 22 and 23 have horizontal and parallel portions 24 and 25, respectively, and upwardly sloping portions 26 and 27, respectively, which engage handles 20 and 21 and position the same at an angle with respect to horizontal portions 24 and 25. The upwardly sloping position of the handles relative the blades facilitates the use of the device.

Handle extension portions 24 and 25 are respectively provided with openings 30 and 31 and blades 10 and 11 are respectively provided with openings 32 and 33 which have common vertical axes with openings 30 and 31 respectively. Handle extension 24 which cooperates with and is pivotally connected to blade 10 is spaced upwardly therefrom by spacer 35 and handle extension 25 which is pivotally connected to blade 11 and is spaced upwardly and away from the same by means of spacer 36. Spacers 35 and 36 are respectively provided with openings 37 and 38 which align with their respective handle extension and blade openings. Handle extension 24, spacer 35 and blade 11 are pivotally joined by means of bolt 40 which extends through opening 30, opening 37 and opening 32 in the respective members and is secured thereto by means of nut 41 which is threadably received by bolt 40. Likewise, bolt 42 pivotally connects blade 10, spacer 36 and handle extension 25 by extending through aligned openings 31, 38 and 32. The exposed end of bolt 42 threadably receives nut 43 thereby holding the blade 10, handle extension 25 and spacer 36 together.

The elements heretofore described are common to both embodiments of this invention. Reference is now made to the first embodiment for adjusting the mechanical advantage between the blades and handles.

Referring to FIGURES 1, 2, 3 and 4, blade extension 24 is provided with an integral and vertically extending flange 50 and blade extension 25 is provided also with an integral and vertically extending flange 51. Flanges 50 and 51 are connected by and pivot about hinge 52 and, likewise, when blades 10 and 11 are in a closed position, hinge 52 is adapted to pivot from a forward position as shown in FIGURE 1, being forward relative blade pivot 14 to a position as shown in FIGURE 2 being rearward of the same. Hinge 52 includes hinge sides 53 and 54 which are respectively provided with looped members 55 and 56, respectively. Loop members 55 and 56 are axially aligned and superimposed so as to receive a common hinge pin 57 and thereby provide a fulcrum about which hinge sides 53 and 54 pivot. The end portions of hinge sides 53 and 54 are bent inwardly and are pivoted to flanges 50 and 51, respectively, by means of pintles 58 and 59. Thus, it can be seen that hinge 52 may be pivoted about pintles 58 and 59 from a forward position as shown in FIGURE 1 to a rearward position as shown in FIGURE 2 and thereby change the mechanical advantage from one which includes a slow opening blade movement having great shearing power to one where the blades have a large included angle, are fast opening and have less shearing power. It is also to be noted that in this embodiment, the blades are operative only when the hinge 52 is in a position as shown in FIGURE 1 or a position as shown in FIGURE 2 for only when hinge pin 57 is in a vertical position and has its axes parallel with the axes of bolts 40 and 42 will handle extensions 24 and 25 be operable.

The second embodiment of this invention incorporates the adjustable fulcrum into the handle extensions. Handle extensions 60 and 61 which are integral continuations of handle portions 23' and 22', respectively, normally overlap and each is provided with a series of convoluting openings 63 and 64. Opening 63 is adapted to be superimposed on opening 64 when blades 10' and 11' are in a closed position. Openings 63 and 64 are comprised of a series of open sided circular holes 65 which are adapted to receive a fulcrum 67. Fulcrum 67 provides the desired movable pivot.

Fulcrum 67 is comprised of a housing cylinder 68, compression spring 69 and a shaft 70. Housing cylinder 68 includes cylinder walls 71, an inwardly projecting annular flange 72 and an annular end wall 73 which overhangs the cylinder wall 71 so as to provide a gripping means for the user. Shaft 70 is provided with annular disc shaped ends 74 and 75 with the diameter of end 75 being smaller than the inner diameter of cylinder wall 71 and being adapted to slidably reside in the same. Spring 69 resides between annular flange 72 and disc 75 and normally acts to force disc 75 against end wall 73 of housing cylinder 68.

In operation, fulcrum 67 normally resides in a selected open-ended hole 65 with bottom annular disc 74 being received by an indented trough 80 which extends the length of opening 64 in handle extension 61 so as to secure fulcrum 67 in handle extensions 61 and 60 and so as not to interfere with the movement of blades 10' and 11'. In moving fulcrum 67 from one location to another in openings 63 and 64 and thereby changing the mechanical advantage between the blades 10' and 11' and handles 20' and 21', housing cylinder 68 is pulled upwardly against the force exerted thereon by compression spring 69 into a position above handle extension 60 as shown in FIGURE 11. Shaft 70 is then adapted to slide through the opening in open-ended hole 65 and to a new position whereupon housing cylinder 68 is released and slides into that selected opening thereby changing the position of fulcrum 67 relative the blade pivot.

It is also considered to be within the scope of this invention to provide the blades with openings as has been shown in the second embodiment in the handle extensions and also to provide the blades with a fulcrum means so that the pivot point of the blades may be adjusted relative to a stationary pivot point existing between the handle extensions and thus vary the mechanical advantage. It is also contemplated to be within the scope of this invention to provide either the handle extensions or blades with a fulcrum means substantially as disclosed which rides in a track and frictionally engages the same at any select point along the track so as to provide a point about which either the blades or the handle extensions may pivot.

Many different embodiments of this invention may be made without departing from the scope and spirit thereof. Therefore, it is to be understood that this invention is not to be limited to the specific embodiments shown and described herein, except as defined in the appended claims.

What is claimed is:

1. Compound action shears adapted to cut both heavy and light material by being provided with a variable mechanical advantage comprising:
   (a) a pair of parallel blades having cooperating contacting cutting edges and a first pivotal connection pivotally joining said blades at the rearward ends thereof and operative around an axis which is perpendicular to said blades;
   (b) a pair of handles having forwardly projecting and intersecting handle extensions positioned parallel to said blades and a second pivotal connection pivotally joining said handle extensions and operative around an axis which is parallel to and in alignment along the central longitudinal axis of the shears with said first pivotal connection axis;
   (c) third and fourth pivotal connections pivotally joining each handle extension to a selected blade at positions forwardly from said first pivotal connection; and
   (d) means adjustably mounting at least one of said first and second pivotal connections in a plurality of operative and longitudinally disposed positions and adapting said first and second pivotal connections to be selectively positioned relative to each other along said central longitudinal axis whereby to regulate the said mechanical advantage by the relative positioning of said first and second pivotal connections.

2. Compound action shears adapted to cut both heavy and light material by being provided with a variable mechanical advantage comprising:
   (a) a pair of parallel blades having cooperating contacting cutting edges and having a floating blade pivot pivotally joining said blades at their respective rearward portion and operative around an axis which is perpendicular to said blades;
   (b) a pair of handles having forwardly projecting and intersecting handle extensions overlying portions of said blades;
   (c) a pintle provided for each handle extension and pivotally connecting each handle extension to a selected blade at positions forwardly from said blade pivot; and
   (d) an adjustable handle extension pivot means pivotally joining said handle extensions at the intersection thereof and operable around an axis parallel to said blade pivot axis and being movable between positions forwardly and rearwardly of said blade pivot along a predetermined longitudinal axis which perpendicularly intersects said blade pivot axis whereby the mechanical advantage between said handles and said blades may be selectively changed.

3. The compound action shears of claim 2 wherein said adjustable handle extension pivot means is comprised of flanges integrally extending upwardly from respective handle extensions and a hinge being pivotally joined to said flanges, said hinge being comprised of substantially L-shaped opposed hinge sides each having first legs extending parallel with and pivotally connected to respective flanges and second legs provided with axially aligned openings and a pin means extending through said axially aligned openings and pivotally joining said hinge sides, said hinge benig pivotable about said flanges along said longitudinal axis to position said pin means forwardly of and rearwardly of said blade pivot, said compound action shears being operative when the axis of said pin means in parallel with the axis of said blade pivot.

4. The compound action shears of claim 2 wherein said handle extensions, when said blades are closed, intersect in an overlapping contiguous relationship which extends forwardly and rearwardly of said blade pivot and are provided with a plurality of openings spaced forwardly and rearwardly of said blade pivot along the contiguous portions of said handle extensions and along said longitudinal axis, said openings extending through said handle extensions and having their axis parallel with said blade pivot axis and including fulcrum means adapted to reside in any selected vertically extending opening and being movable to another selected opening, said handle extensions being pivotable about said fulcrum means when residing in any selected opening.

5. The compound action shears of claim 4 wherein said openings are connected by longitudinally extending passageways, said fulcrum means adapted to be moved through said passageways when being relocated.

6. The compound action shears of claim 5 wherein said fulcrum means is comprised of a shaft having first and second disc ends, said shaft adapted to pass through said passageways connecting and extending the axial length of said openings, said first disc end being larger than said openings and said second disc end being smaller than said openings, and a cylindrical housing having an open and a closed end, said open end having an inwardly projecting flange, said cylindrical housing being slidably mounted on said shaft with its limits of travel being established by said second disc end cooperating with said flange, said cylindrical housing adapted to reside in any selected opening in said handle extension about which said handle extensions pivot and adapted to be pulled out of contact with said handle extensions upon moving said fulcrum to another opening.

7. The compound action shears of claim 5 including a coil compression spring mounted on said shaft within said housing and between said second disc end and said flange, said spring tending to force said housing toward said extensions whereby to maintain said housing in said selected opening.

References Cited

UNITED STATES PATENTS

| 1,607,470 | 11/1926 | McKenney | 30—252 |
| 2,558,697 | 6/1951 | Vosbikian | 30—252 |
| 3,187,430 | 6/1965 | Wallace | 30—252 |

ROBERT C. RIORDON, *Primary Examiner.*

J. C. PETERS, *Assistant Examiner.*

U.S. Cl. X.R.

30—257, 260